United States Patent

Haller et al.

[11] Patent Number: 5,896,793
[45] Date of Patent: Apr. 27, 1999

[54] APPARATUS FOR FEEDING BAR STOCK TO AN AUTOMATIC SCREW MACHINE

[75] Inventors: Dennis A. Haller, Washington Township; Mark W. Winkler, Harsens Island; John J. Saputo, Clinton Township, all of Mich.

[73] Assignee: SKI Industries, Shelby Township, Mich.

[21] Appl. No.: 08/845,600

[22] Filed: Apr. 25, 1997

[51] Int. Cl.⁶ .................................................. B23B 13/04
[52] U.S. Cl. ............................... 82/126; 82/127; 82/129; 414/14; 414/17
[58] Field of Search .............................. 82/126, 127, 125, 82/129; 414/14, 17, 18, 736

[56] References Cited

U.S. PATENT DOCUMENTS

| | | | |
|---|---|---|---|
| 2,811,884 | 11/1957 | Jones, Jr. | 82/2.5 |
| 3,010,605 | 11/1961 | Jones, Jr. | 221/81 |
| 3,557,971 | 1/1971 | Tomiyama . | |
| 4,037,733 | 7/1977 | Doe et al. . | |
| 4,149,437 | 4/1979 | Winberg et al. | 82/38 A |
| 4,292,864 | 10/1981 | Cucchi et al. | 82/2.7 |
| 4,417,491 | 11/1983 | Uehara et al. | 82/2.7 |
| 4,604,924 | 8/1986 | Cucchi et al. | 82/27 |
| 4,617,847 | 10/1986 | Schaldach | 414/14 X |
| 4,624,612 | 11/1986 | Geiser et al. . | |
| 4,649,779 | 3/1987 | Juillerat . | |
| 4,664,002 | 5/1987 | Cucchi et al. | 82/126 |
| 4,700,593 | 10/1987 | Cucchi | 82/126 X |
| 4,860,429 | 8/1989 | von Haas . | |
| 4,914,993 | 4/1990 | Fabbri . | |
| 5,066,185 | 11/1991 | Cucchi . | |
| 5,115,702 | 5/1992 | Link | 82/126 |
| 5,140,878 | 8/1992 | Fabbri . | |
| 5,142,766 | 9/1992 | Wehrmeister | 414/736 X |
| 5,170,685 | 12/1992 | Cucchi | 82/127 |
| 5,320,008 | 6/1994 | Cucchi . | |
| 5,326,210 | 7/1994 | Savage . | |
| 5,520,493 | 5/1996 | Cucchi . | |
| 5,562,381 | 10/1996 | Cucchi . | |
| 5,649,462 | 7/1997 | Cucchi . | |
| 5,662,014 | 9/1997 | Link | 82/127 X |

*Primary Examiner*—Andrea L. Pitts
*Assistant Examiner*—Henry W. H. Tsai
*Attorney, Agent, or Firm*—Brooks & Kushman P.C.

[57] ABSTRACT

An apparatus for feeding and engaging bar stock into an automatic screw machine having at least one clamp, at least one linear actuator, an apparatus for feeding material into the clamps, and a mechanism for facilitating opening and closing the clamps. The clamps include a base portion, pivotally mounted first and second clamping members, and a cam member extending through the base portion which engages the first and second clamping members. The clamps are mounted to a tubular support which rotates in conjunction with the spindle carrier of the automatic screw machine. The mechanism for facilitating opening and closing of the clamps engages an end portion of the at least one linear actuator to displace the cam member. The cam member disengages the clamping members causing the clamping members to open such that the bar stock can be fed into the clamping members and closed thereafter in a positive locking arrangement.

14 Claims, 7 Drawing Sheets

APPARATUS FOR FEEDING BAR STOCK TO AN AUTOMATIC SCREW MACHINE

TECHNICAL FIELD

This invention relates to an apparatus for feeding bar stock of different shapes and sizes to an automatic screw machine.

BACKGROUND ART

Automatic screw machines with single spindle and multiple spindle lathes are provided with a bar stock feeding apparatus which feeds bar stock to the machine. Bar stock can be formed in a variety of shapes and sizes. The most common type of bar stock is circular in shape. Square and hexagonal bar stock may also be machined in automatic screw machines. However, most conventional bar stock retaining mechanisms cannot be easily adapted to engage and feed different shapes and sizes of bar stock.

Two common clamping arrangements are used for automatically engaging and feeding bar stock to an automatic screw machine. The first type of clamping arrangement comprises an endless belt and pulley arrangement for feeding bar stock. An example of this type of arrangement is disclosed in U.S. Pat. No. 4,417,491 issued to Uehara et al., which discloses an apparatus for automatically feeding bar stock material into a machine tool with a plurality of bar stock clamping members. Each bar stock clamping member has a pair of bar engaging jaws with a set of guide pulleys and a drive pulley. An endless belt connects the guide pulleys and drive pulley to create an isosceles triangle gripping arrangement. The pair of jaws is rotatably mounted on a swingable arm which is attached to a support plate. The clamping jaws are rotated into contact with the bar stock to keep the bar stock aligned with the spindle of the lathe. This arrangement is particularly susceptible to mechanical breakdowns and endless belt failures.

The second type of clamping arrangement consists of a movable clamping portion and a fixed clamping guide portion. U.S. Pat. No. 4,292,864 to Cucchi et al. discloses an automatic feeder for a multi-mandrel lathe. The '864 patent provides a plurality of clamping members having a fixed clamping element and a movable clamping element. Each clamping element has an elastomeric coating on the interior surface. The movable clamping element is pivotally attached to an adjacent fixed clamping element of another clamping pair by a hinge. The movable clamping element pivots about the hinge to open to receive a length of bar stock.

The arrangement disclosed in the '864 patent is not an efficient method of clamping bar stock when a multiple spindle lathe is operated at high speeds. Changing bar stock using this arrangement may cause machine down time of up to 30%. Also, if one of the clamps is damaged during operation, the entire clamping arrangement must be replaced. In addition, the clamping arrangement disclosed in the '864 patent does not positively lock the clamping portions around the bar stock. Bar stock may work loose in such a clamping arrangement because the clamp is not positively locked.

Another problem associated with the '864 patent is loading and feeding bar stock into the clamping members. Sections of bar stock are typically are 8 to 12 feet in length and may range in weight to over 200 pounds. The arrangement in the '864 patent requires the operator to load the bar stock at the top of the bar feeding apparatus so the bar stock can be gravity loaded into the clamping members. This loading arrangement is unwieldy and requires heavy loads to be lifted 4 or more feet off the ground.

SUMMARY OF THE INVENTION

According to the present invention, an apparatus for feeding bar stock of different shapes and sizes is provided for use with a single or multiple spindle automatic screw machine. The apparatus includes one or more clamp assemblies in alignment with the spindle of an automatic screw machine to retain the bar stock as it is prepared for machining. Each clamp assembly includes a clam shell clamp, a base portion and a cam member for opening and closing the clam shell clamp. One or more clamp assemblies may be mounted in a spaced relationship on a rotatable tubular support.

The clam shell clamp consists of a pair of clamping members which retain bar stock that may be circular, square or hexagonal in shape. Each clamping member includes an interior portion for receiving the bar stock and an exterior portion. Each clamping member has a set of flat surfaces and an angled surface on the lower portion which are engaged by the cam member. The clamping members are pivotally connected to the base portion by a pair of pivot pins.

A cam member is inserted in an axially extending slot in the base portion to engage the lower portions of the clamping members. The cam member has a pair of diametrically opposed flat outer surfaces and angled outer surfaces which are adapted to engage the flat surfaces and angled surfaces of the clamping members. When the clamping members are closed, the flat outer surfaces of the cam member engage the first set of flat surfaces of the clamping members. The first set of flat surfaces of the clamping members and the cam member engage each other, creating a positive locking arrangement in the closed position to ensure that the bar stock will not be released by the clamping members.

To open the clamping members, the cam member is shifted until the flat and angled surfaces of the cam member engage the second set of flat surfaces and the angled surfaces of the clamping members. Springs are inserted between the clamping members to bias the clamp assembly to open when the cam member is returned to the open position.

In a multiple clamp assembly, each cam member is connected to a cam member in a corresponding clamp assembly on another tubular support by a linear actuator. The linear actuators extend between the clamp assemblies and terminate at an end portion. A connecting ring disposed between the clamp assembly and the end portion holds each of the linear actuators in alignment.

Bar stock is loaded into the clamp assemblies by a bar feeding magazine. The bar feeding magazine consists of a sloped magazine for storing bar stock that is loaded from the side of the bar feeding magazine. The bar stock drops from the magazine into the loading arms. The loading arms pivot to lift the bar stock into the clamp assemblies. After the bar stock is loaded into the clamp assemblies, the loading arms pivot back to a rest position to receive another section of bar stock.

A rocker arm assembly is used to open and close the clamp assemblies. The rocker arm assembly includes a hydraulic piston and a pivotally mounted arm disposed at one end of the apparatus away from the spindle of the automatic screw machine. A portion of the pivoting arm engages the end portion of the linear actuator causing the cam member to shift the clamping members to an open position. The return of the rocker arm assembly to the rest position allows a spring mounted on the linear actuator between the connecting ring and end portion of the linear actuator causes the cam member to disengage the clamping members thereby closing the clamp assembly. In another embodiment of the invention, the linear actuators are actuated by a hydraulic ram to open and close the clamp assemblies around the bar stock.

It is an object of the present invention to provide an apparatus for simply and effectively engaging and feeding bar stock of different shapes and sizes into a single or multiple spindle automatic screw machine.

It is another object of the invention to provide an apparatus for a single or multiple spindle automatic screw machine wherein the apparatus includes one or more clamps spaced radially around a rotatable tubular support, each clamping member having a pair of clamping portions which are opened and closed around the bar stock.

It is a further object of the invention to provide a clamping arrangement for a single or multiple spindle automatic screw machine wherein both halves of the clam shell clamp are opened and closed by a cam member.

It is another object of the invention to provide a clamping arrangement for a single or multiple spindle automatic screw machine wherein a cam member is used as a lock in the clamping arrangement which is connected to a linear actuator displaced by a rocker arm assembly.

It is yet another object of the invention to provide a clamping arrangement for a single or multiple spindle automatic screw machine wherein a cam member is used as a lock in the clamping arrangement which is connected to a linear actuator displaced by a hydraulic ram.

It is another object of the invention to provide an apparatus for feeding bar stock to a single or multiple spindle automatic screw machine which includes a bar lifting mechanism for loading bar stock into the clamping members.

It is a further object of the invention to provide an apparatus for engaging and feeding bar stock material to a single or multiple spindle automatic screw machine which is modular in construction.

Other objects of the invention are disclosed in the following description of the best mode of the invention. The structural and functional characteristics of the present invention and its advantages over the known art will become more apparent from the following illustrative description which refers to the appended drawings of two embodiments thereof based on the principles of the invention.

BEST MODE FOR CARRYING OUT THE INVENTION

Figure 1:
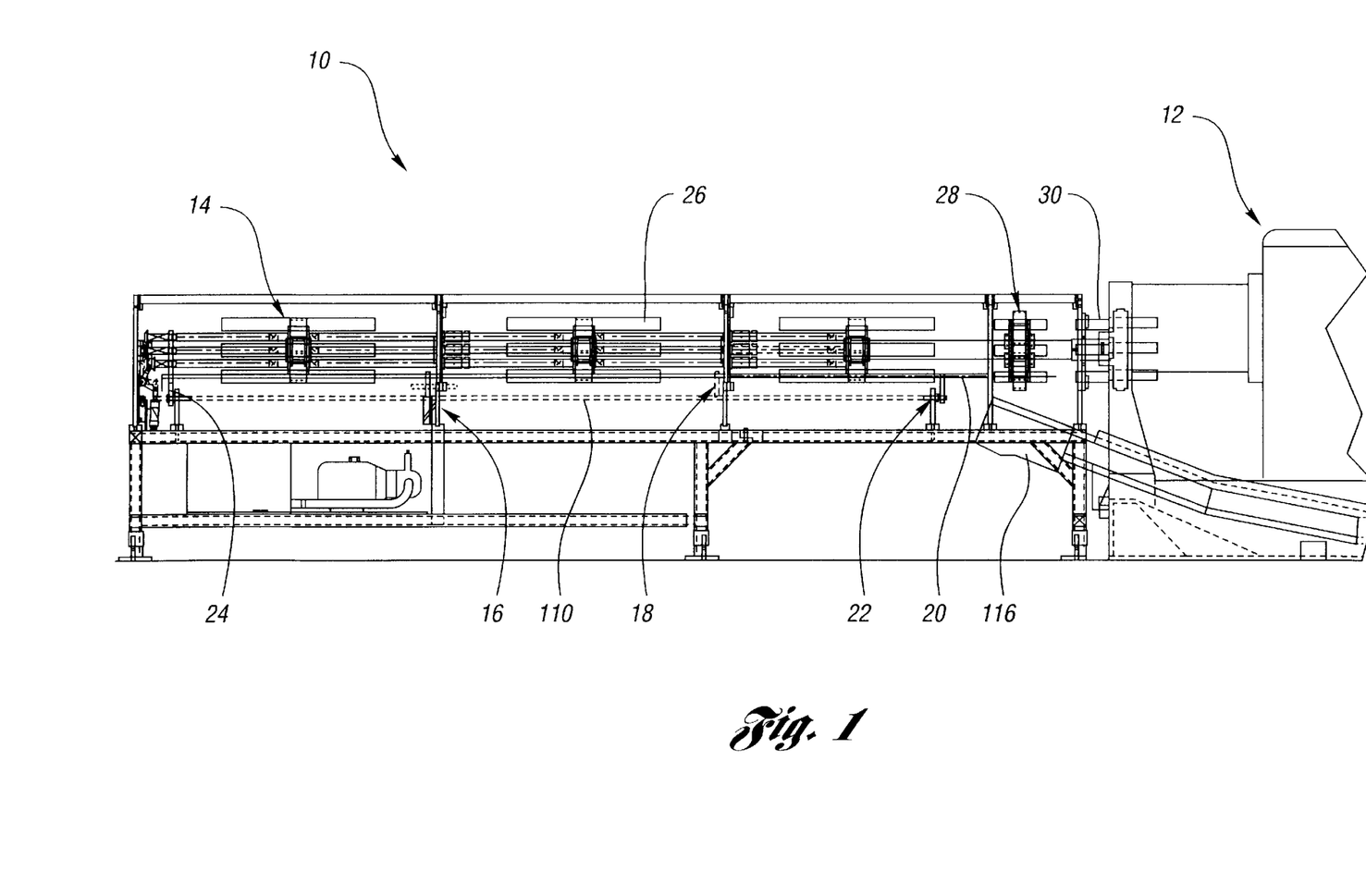
FIG. 1 is a side elevation view of an apparatus for feeding bar stock of the present invention in conjunction with an automatic screw machine.

Referring now to FIG. 1, an apparatus for feeding bar stock into an automatic screw machine, generally indicated by reference numeral 10, is provided for use in conjunction with an automatic screw machine 12. Apparatus 10 includes a clamp assembly 14, a bar feed assembly 16, and a bar loading assembly 18. In the preferred embodiment, apparatus 10 is modular in construction, having two or more clamp assemblies per spindle, depending upon the maximum length of bar stock to be fed into the automatic screw machine 12. Bar stock 20 is loaded into the clamp assemblies from a magazine 22 to loading arms 24 of bar loading assembly 18. The bar stock 20 is fed by loading arms 24 into split tube sections 26 mounted into clam shell clamps 28. The split tube sections 26 hold the bar stock 20 in position for insertion into spindle 30 of automatic screw machine 12.

Figure 2:
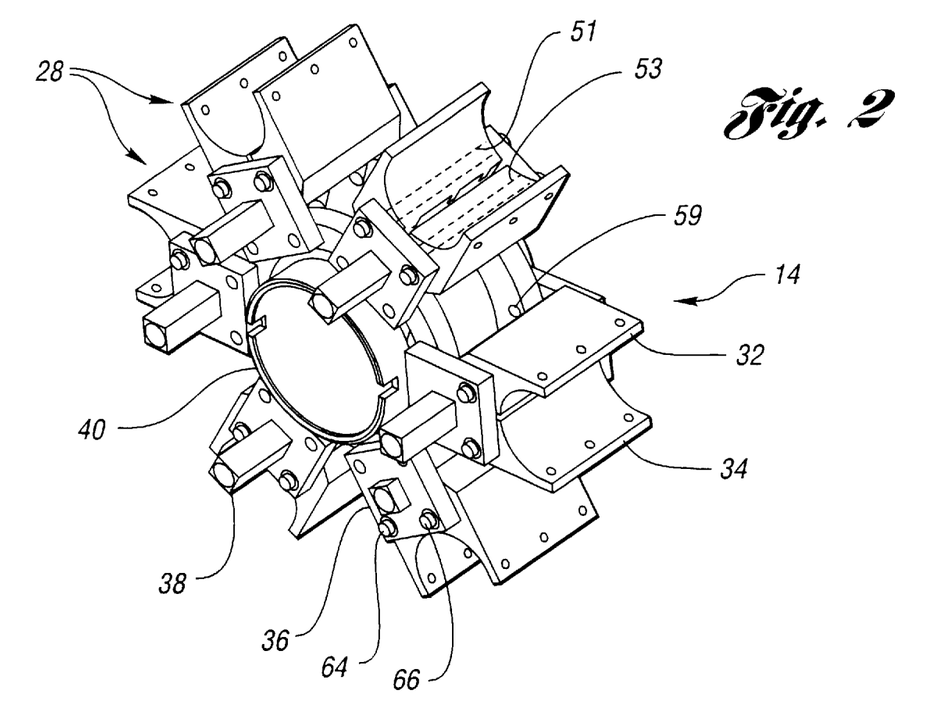
FIG. 2 is a perspective view of an array of clamp assemblies of the present invention.
Figure 3:
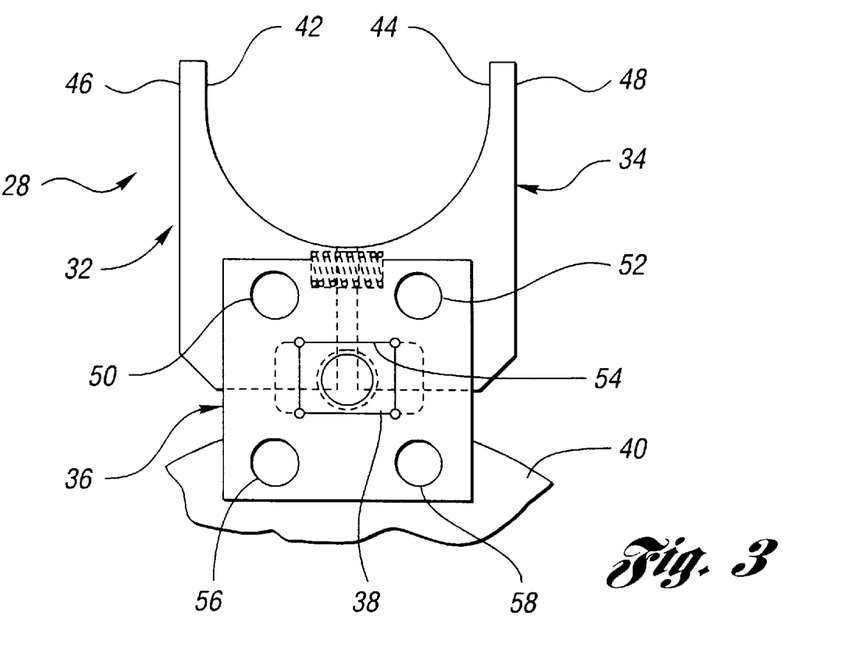
FIG. 3 is an end elevational view of a clamp assembly of the present invention.
Figure 4:
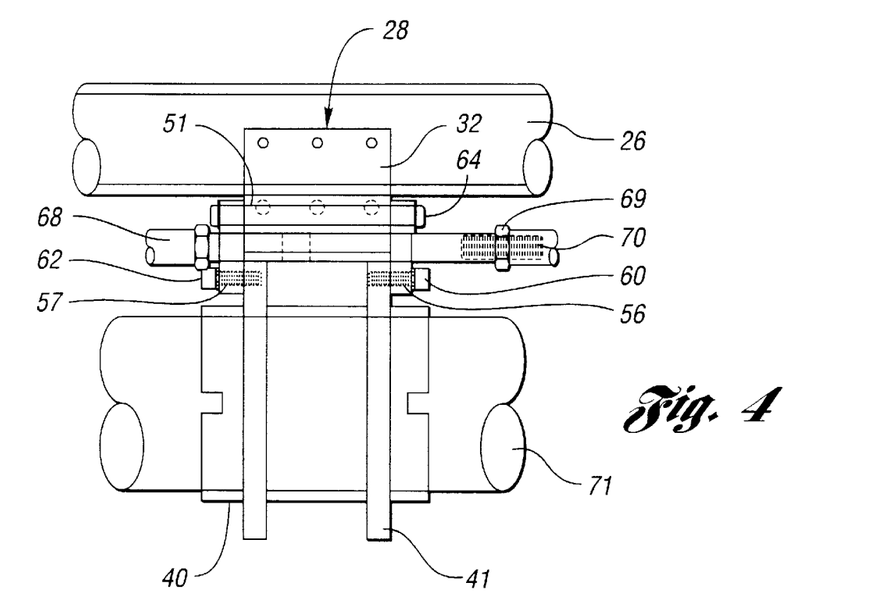
FIG. 4 is a side elevational view of a clamp assembly of the present invention.

Referring now to FIGS. 2–4, clamp assembly 14 has one or more clam shell clamps 28. Each clam shell clamp 28 has a first clamping member 32, a second clamping member 34 opposed from the first clamping member, a base portion 36 and a cam member 38. Base portion 36 of clam shell clamps 28 are assembled to rotatable tubular support 40. Mounting flanges 41 of tubular support 40 are adapted to engage clam shell clamps 28 to secure the clamps to the support.

First and second clamping members 32, 34 of clam shell clamp 28 have interior portions 42, 44 and exterior portions 46, 48, respectively. Sections of split tube 26 are mounted to interior portions 42, 44. Split tube sections 26 mounted to interior portions 42, 44 are adapted to receive a section of bar stock 20. In the preferred embodiment, interior portions 42, 44 are concave partial circular sections.

Base portion 36 is provided with apertures 50, 52 which are aligned with axially extending bores 51, 53 in first clamping member 32 and second clamping member 34. A control slot 54 extends axially through the base portion to receive cam member 38. Apertures 56, 57, 58 are aligned with apertures in mounting flange 41 of tubular support 40 to receive a fastening device to mount the clam shell clamp 28 to tubular support 40.

Clam shell clamp 28 is fixedly mounted to mounting flanges 41 by fasteners 60, 62. First and second pins 64 and 66 are inserted into apertures 50, 52 and extend axially through first and second bores 51, 53 in clamping members 32, 34. First and second securing members 64, 66 pivotally connect first and second clamping members 32, 34 so that the clamping members pivot away from each other to receive bar stock 20. A linear actuator 68 is connected to cam member 38 by a fastener 70.

In the preferred embodiment, one or more clamp assemblies 14 are provided on bar feeding apparatus 10. At least one linear actuator 68 has a first end 69 which connects the cam members 38 of all aligned clam shell clamps 28 to open and close all aligned clam shell clamps 28 simultaneously.

Clam shell clamps 28 are secured to the mounting flanges 41 in alignment on the tubular support 40. Tubular support 40 extends through the mounting flanges 41 so retention clamp assemblies 14 are aligned and rotate together.

Figures 5, 6:
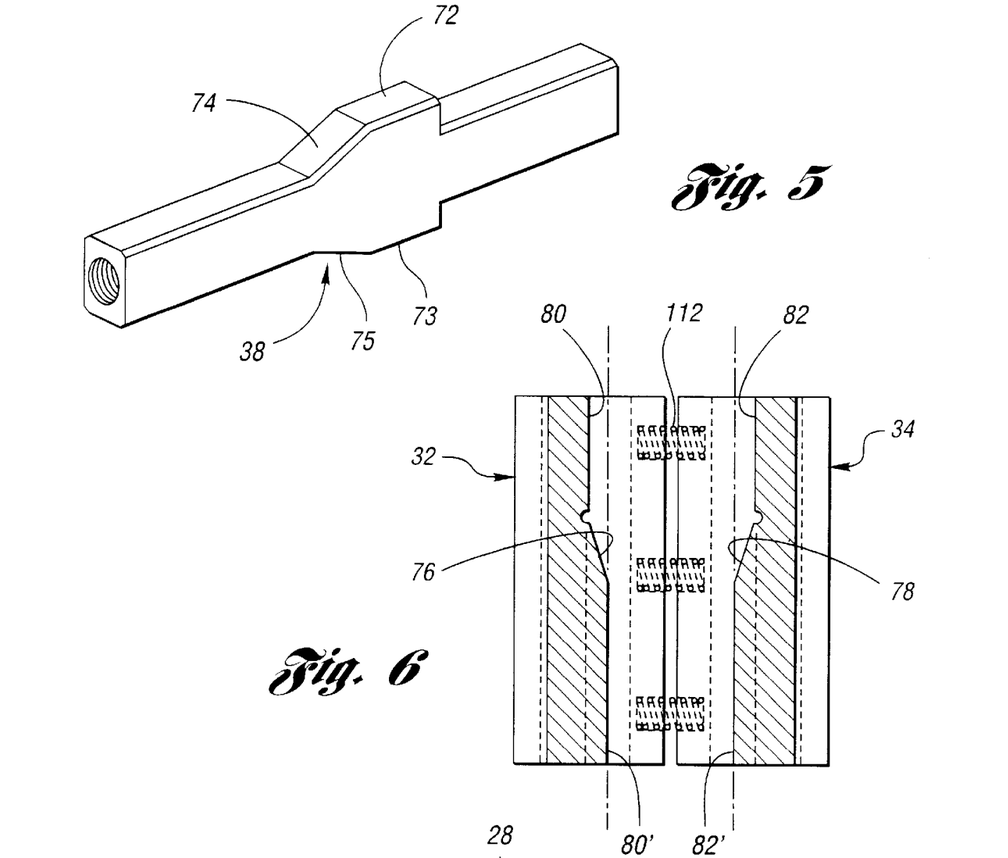
FIG. 5 is a perspective view of a cam member of the clamp assembly of the present invention.
FIG. 6 is a cross-sectional view of a lower portion of the clamp assembly of the present invention.

Referring now to FIGS. 3, 5 and 6, cam member 38 of clam shell clamp 28 have flat outer surfaces 72, 73 and angled outer surfaces 74, 75. Cam member 38 is disposed between base portion 36, first clamping member 32 and second clamping member 34. First and second members 32, 34 are provided with angled inner surfaces 76, 78 a first set of flat inner surfaces 80, 82 and a second set of flat inner surfaces 80', 82'. Flat outer surfaces 72, 73 of cam member 38 operatively engage the first set of flat inner surfaces 80, 82 and the second set of flat inner surfaces 80', 82' to open and close first and second clamping members 32, 34.

Figure 7:
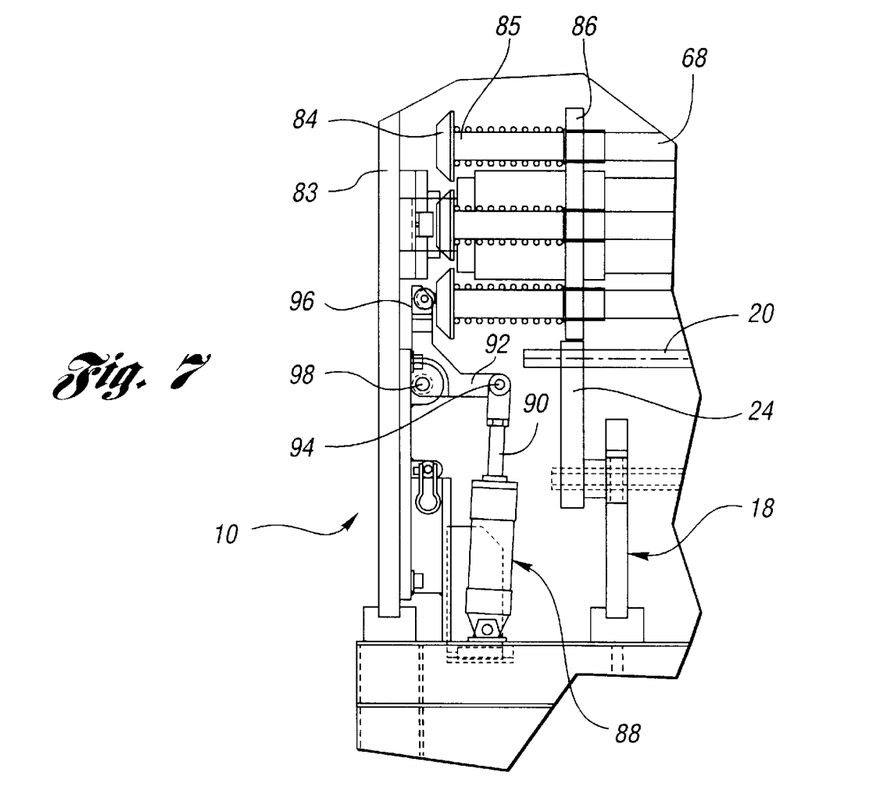
FIG. 7 is a side elevational view of the rocker arm assembly in the closed position of the present invention.
Figure 8:
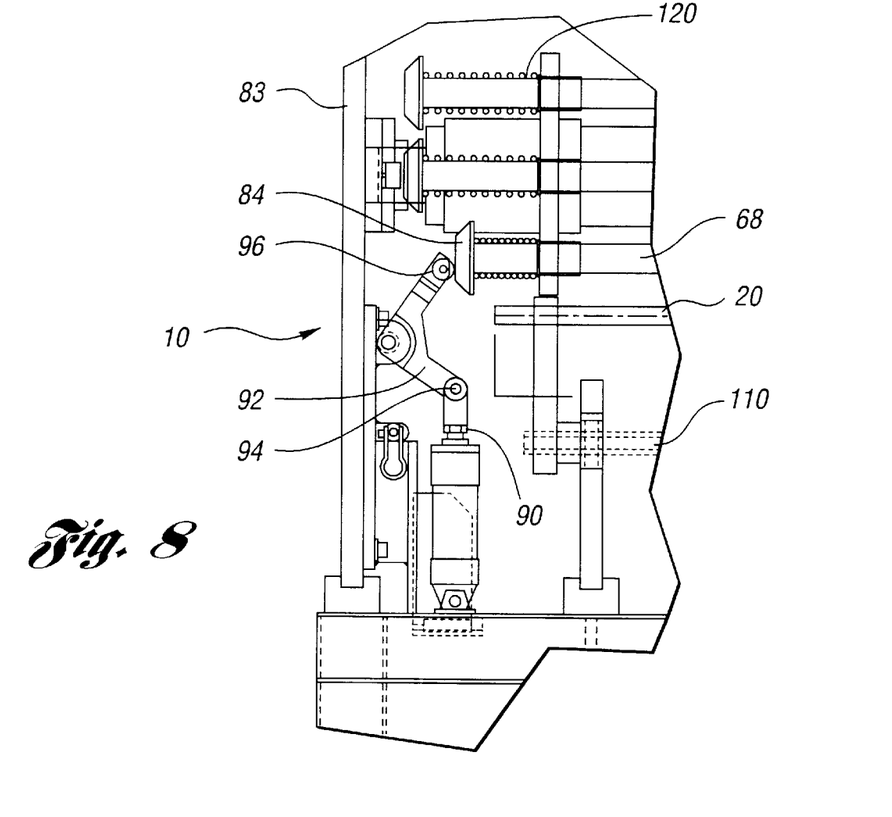
FIG. 8 is a side elevational view of the rocker arm assembly in the open position of the present invention.

Referring now to FIGS. 1, 7 and 8, linear actuators 68 extend away from spindle 30 of automatic screw machine 12 towards an end 83 of the apparatus 10. Each linear actuator 68 terminates at an end cap 84 at a second end 85. In the preferred embodiment, each clamp assembly 14 is provided with more than one clam shell clamp 28. Each of the clam shell clamps 28 has a linear actuator 68 extending toward the end 83 of apparatus 10. A connecting ring 86 aligns linear actuators 68 with aligned clam shell clamps 28 which open and close simultaneously.

A mechanism, such as rocker arm assembly 88, opens and closes cam members 38 of clam shell clamps 28. Rocker arm assembly 88 consists of a hydraulic piston 90 which is connected to arm 92 at joint 94. Portion 96 of arm 92 engages end cap 84 of linear actuator 68. The motion of hydraulic piston 90 is transferred to arm 92, and in turn to the linear actuator 68, about pivot 98 mounted to the apparatus 10.

Figure 9:
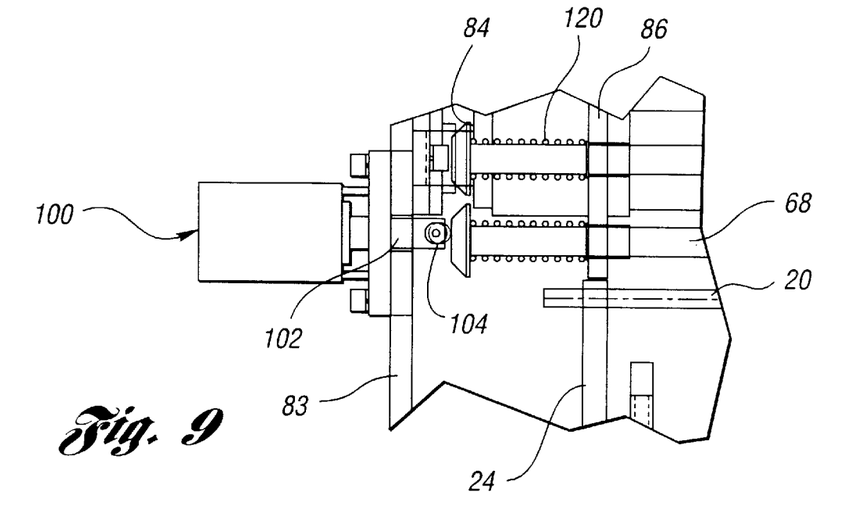
FIG. 9 is a side elevational view of a second embodiment of the opening mechanism of the present invention.

Referring to FIG. 9, another embodiment of the invention is shown wherein the mechanism for opening and closing the clamp assemblies is a hydraulic ram 100. Hydraulic ram 100 is secured to the exterior of apparatus 10 to engage linear actuator 68. Hydraulic ram 100 has a piston rod 102 which supports a roller 104. Roller 104 of piston rod 102 engages end cap 84 of the linear actuator 68 to shift cam members 38.

Figure 10:
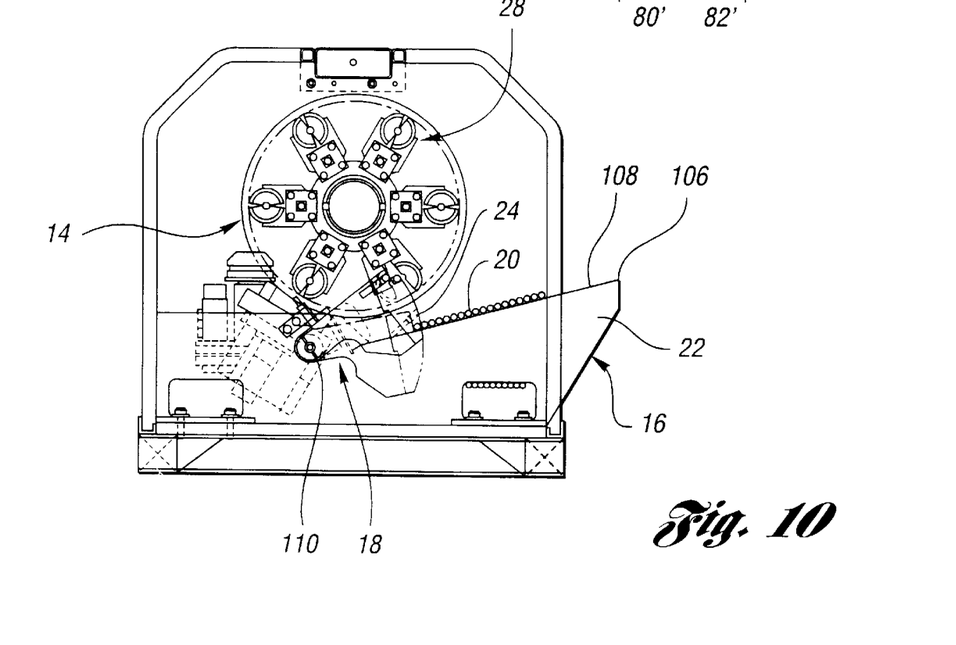
FIG. 10 is an end elevational view of the bar feeder mechanism of the present invention.

Referring now to FIG. 10, bar feed assembly 16 and bar loading assembly 18 of apparatus 10 is discussed in greater detail. Bar stock 20 is loaded by the operator onto magazine 22. In the preferred embodiment, loading portion 106 of magazine 22 is placed at a level below the operator's hands to facilitate easier loading of bar stock 20. After the bar stock 20 has been loaded on to magazine 22, the bar stock rolls or slides down a sloped portion 108 towards loading arms 24. Once the bar stock 20 has been loaded on to loading arms 24, the arms 24 pivot about shaft 110 to lift the bar stock 20 into engagement with clam shell clamps 28. After the bar stock 20 has been loaded into clam shell clamps 28, loading arms 24 return to the loading position.

Figures 11, 12:
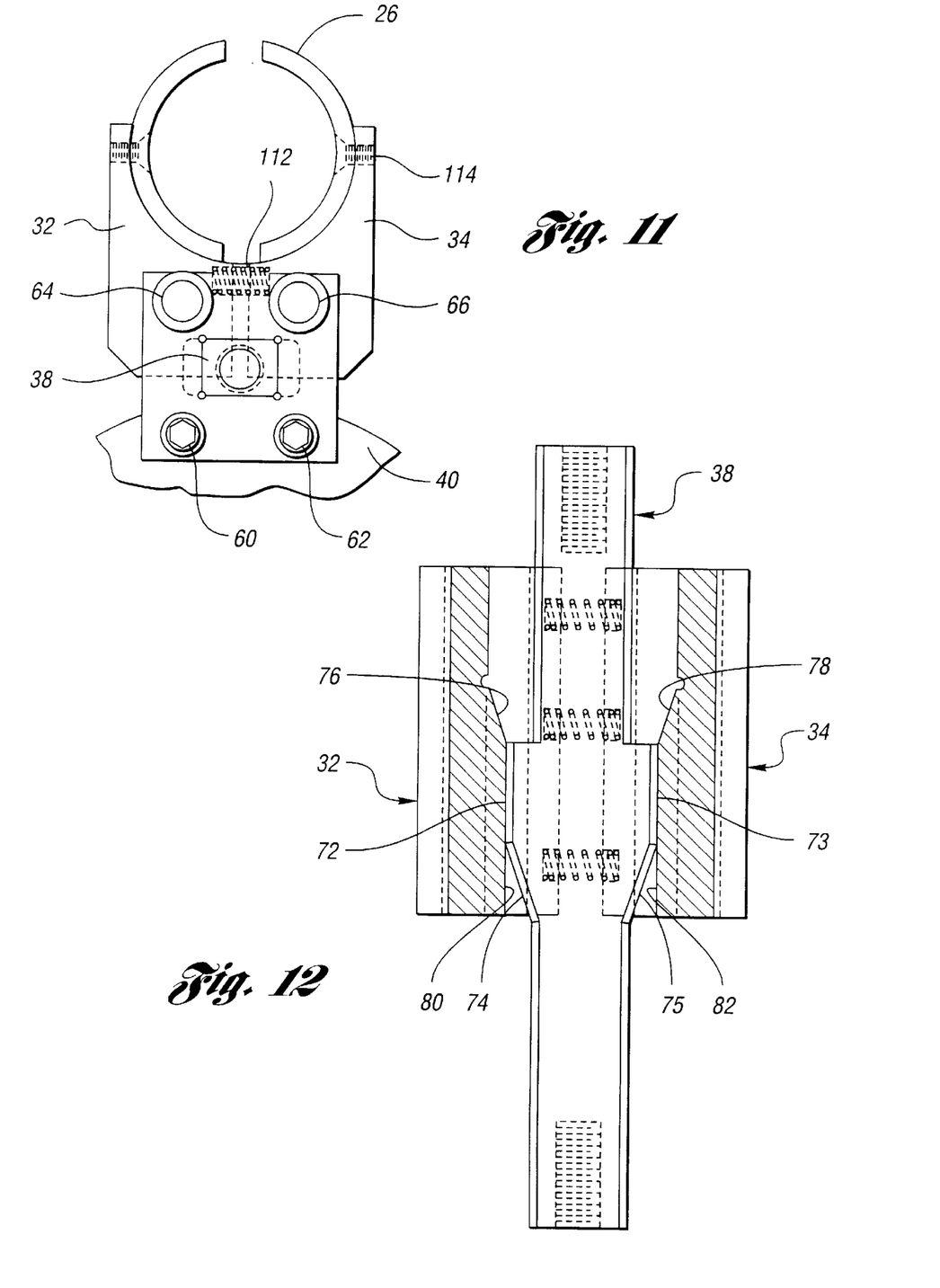
FIG. 11 is an end elevational view of the clam shell clamp assembly in the closed position.
FIG. 12 is a cross-sectional view of the clam shell clamp assembly in the closed position.

Referring now to FIGS. 11 and 12, the clam shell clamp 28 is shown in the closed position. Flat outer surfaces 72, 73 of cam member 38 engage the first set of flat inner surfaces 80, 82 of first and second clamping members 32, 34. Springs 112 are mounted between first and second clamping members 32, 34. Split tube sections 26 mounted in clamping members 32, 34 remain closed around bar stock 20. In the preferred embodiment, split tube sections 26 are fastened to first and second clamping members 32, 34 by fasteners 114 to keep the bar stock 20 in a clamping arrangement during machining.

Opening and closing of the clam shell clamps 28 is discussed in detail below. Upon completion of machining of the piece of bar stock 20, automatic screw machine 12 releases the remaining bar stock 20 from spindle onto slide 116. Hydraulic piston 90 of rocker arm assembly 88 retracts causing arm 92 to pivot about joint 94. End portion 96 of arm 92 engages end cap 84 of linear actuator 68 causing the linear actuators 68 and cam members 38 to be linearly displaced.

As is best seen in FIGS. 7–9, 13 and 14, cam member 38 is moved from a closed position to an open position such that flat outer surfaces 72, 73 and angled outer surfaces 74, 75 of cam member 38 engage second set of flat inner surfaces 80', 82' and angled inner surfaces 76, 78 of first and second clamping members 32, 34. As the cam member 38 moves from the closed position to the open position, first and second clamping members 32, 34, pivot about first and second securing members 64, 66. Loading arms 24 of bar loading assembly 18 lift bar stock 20 from the loading position to a position in alignment with opening 118 in clam shell clamp 28.

Figures 13, 14:
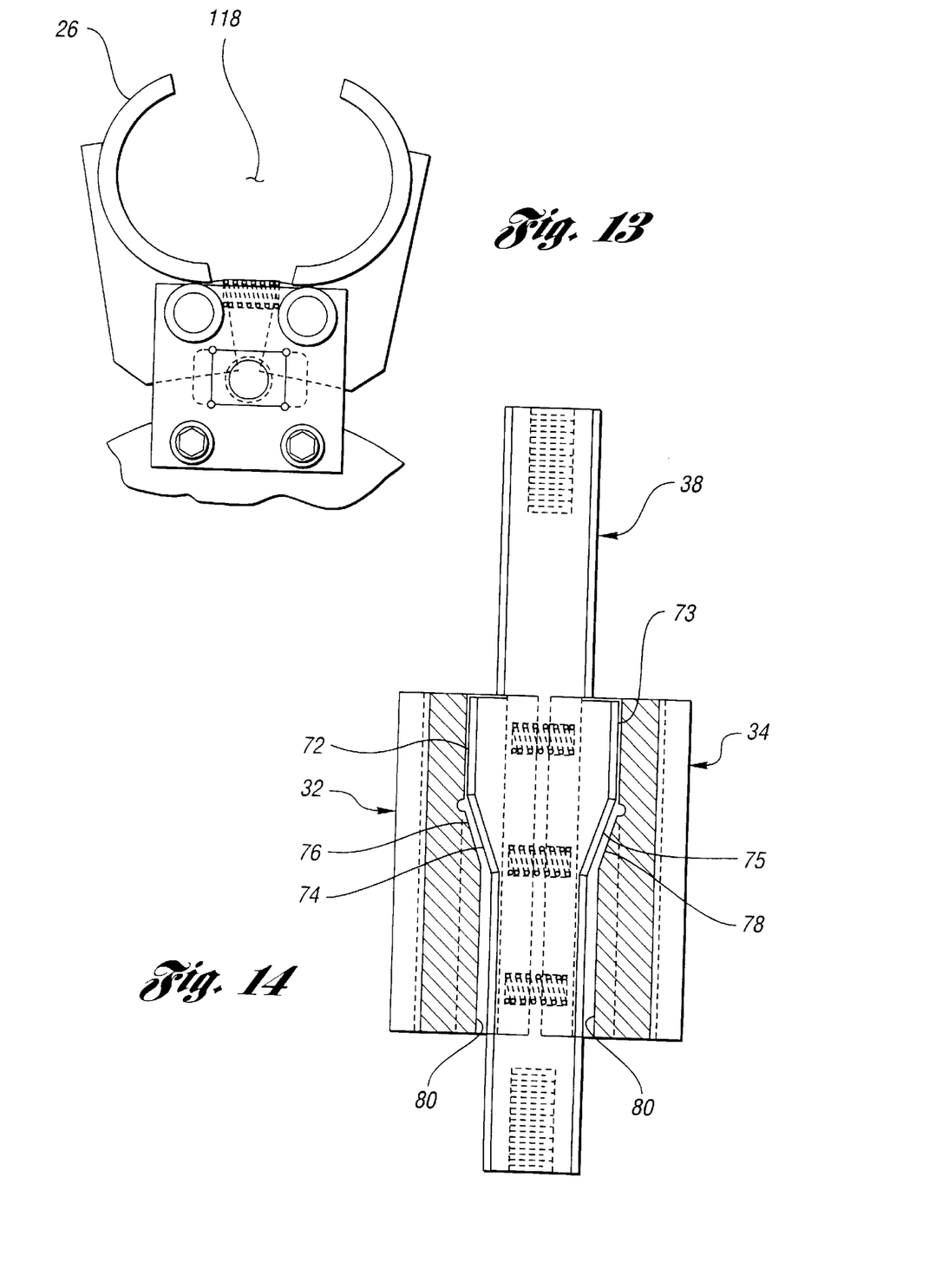
FIG. 13 is a front elevational view of the clam shell clamp assembly in the open position.
FIG. 14 is a cross-sectional view of the clam shell clamp assembly in the open position.

After bar stock 20 is inserted into opening 118 in clam shell clamp 28, hydraulic piston 90 is extended causing end portion 96 of arm 92 to retract from end cap 84 of linear actuator 68. Spring 120 mounted on linear actuator 68 between end cap 84 and connecting ring 86 causes the linear actuator 68 to return to the closed position. Cam member 38 attached to linear actuator 68 moves from an open position to a closed position such that flat outer surfaces 72, 73 engage the first set of flat inner surfaces 80, 82 of first and second clamping members 32, 34.

First and second clamping members 32, 34 pivot about first and second securing members 64, 66 to close split tube sections 26 around bar stock 20, positively locking the bar stock 20 in the clam shell clamp 28. Springs 112 bias the clamping members open when the cam is moved in the opposite direction.

In another embodiment of the invention, hydraulic ram 100 replaces rocker arm assembly 88 for opening and closing the clam shell retention clamps 30 by acting on end caps 84 of linear actuators 68.

While this invention has been described in detail with particular reference to preferred embodiments thereof, it will be understood that variations and modifications can be effected within the spirit and scope of the invention as described and defined in the appended claims.

What is claimed is:

1. An apparatus for engaging and feeding material into an automatic screw machine, the apparatus comprising:

at least one clamp, the at least one clamp having a first clamping member, a second clamping member, a base portion and a cam member;

at least one linear actuator having an end portion connected to a first end thereof, the cam member being connected to a second end of the linear actuator; and a mechanism engaging the first end portion of the at least one linear actuator to displace the cam member such that the first and second clamping members of the at least one clamp open and close around the material;

the at least one clamp further comprising:

a base portion having a control slot extending axially through the base portion;

the first clamping member being pivotally connected to the base portion, the first clamping member having an interior portion adapted to receive the material and an exterior portion;

the second clamping member being opposed to the first clamping member and being pivotally connected to the base portion, the second clamping member having an interior portion adapted to receive the material and an exterior portion; and a cam member extending through the control slot in the base portion to pivot the first and second clamping members.

2. The apparatus of claim 1 wherein the at least one clamp includes first and second clamping members having angled surfaces and a set of first and second flat surfaces which are adapted to engage the cam member.

3. The apparatus of claim 1 wherein the cam member of the at least one clamp further comprises flat surfaces and angled surfaces adapted to engage the set of first and second flat surfaces and angled surfaces of the first and second clamping members to positively lock the clamp around the material.

4. The apparatus of claim 1 wherein the at least one clamp includes at least one spring disposed between the first and second clamping members to bias the first and second clamping members in an open position.

5. The apparatus of claim 1 wherein the first and second clamping members of the at least one clamp further comprises a split tube mounted to the interior portion to receive the material.

6. The apparatus of claim 1 wherein the mechanism engaging the end portion of the at least one linear actuator is a rocker arm assembly.

7. The apparatus of claim 1 wherein the mechanism engaging the end portion of the at least one linear actuator is a hydraulic ram.

8. The apparatus of claim 1 wherein the at least one clamp is mounted to a tubular support.

9. The apparatus of claim 8 wherein only one clamp is mounted on the tubular support.

10. The apparatus of claim 8 wherein six clamps are mounted on the tubular support.

11. An apparatus for engaging and feeding material into an automatic screw machine, the apparatus comprising:

at least one clamp, the at least one clamp having a first clamping member, a second clamping member, a base portion and a cam member;

at least one linear actuator having an end portion connected to a first end thereof, the cam member being connected to a second end of the linear actuator; and a mechanism engaging the first end portion of the at least one linear actuator to displace the cam member such that the first and second clamping members of the at least one clamp open and close around the material;

a connecting ring is mounted on the at least one linear actuator between the end portion of the at least one linear actuator and the at least one clamp.

12. The apparatus of claim 11 wherein at least one spring is disposed between the connecting ring and the end portion of the at least one linear actuator.

13. An apparatus for engaging and feeding material into an automatic screw machine, the apparatus comprising:

at least one clamp, the at least one clamp having a first clamping member, a second clamping member, a base portion and a cam member;

at least one linear actuator having an end portion connected to a first end and a cam member connected to a second end;

a feeding mechanism for placing material in the at least one clamp; and a mechanism engaging the end portion of the at least one linear actuator to displace the cam member such that the first and second clamping members of the at least one clamp open and close around the material;

the feeding mechanism further comprising:
a magazine for retaining the material;
a rotatable shaft; and
a plurality of arms mounted to the rotatable shaft that are adapted to receive the material from the magazine to load into the at least one clamp.

14. An apparatus for engaging and feeding material into an automatic screw machine, the apparatus comprising:

at least one clamp, the at least one clamp comprising;

a base portion having a control slot extending axially through the base portion;

a first clamping member pivotally connected to the base portion, the first clamping member having an interior portion adapted to receive the material and an exterior portion;

a second clamping member opposed from the first clamping portion which is pivotally connected to the base portion, the second clamping portion having an interior portion adapted to receive the material and an exterior portion;

at least one spring disposed between the first and second clamping members to bias the first and second clamping members in an open position;

a cam member extending through the control slot in the base portion to pivot the first and second clamping members;

at least one linear actuator, the at least one linear actuator having an end portion connected to a first end and a cam member connected to a second end;

rotatable tubular support for mounting the at least one clamp;

a feeding mechanism having a magazine for retaining the material, a rotatable shaft, and a plurality of arms mounted to the rotatable shaft that are adapted to receive the material from the magazine to load into the at least one clamp; and a mechanism engaging the end portion of the at least one linear actuator to displace the cam member such that the first and second clamping members of the at least one clamp open and close around the material.

* * * * *